Dec. 21, 1954  K. J. KNUDSEN  2,697,356
SEALED MOVEMENT-TRANSMITTING DEVICE
Filed July 29, 1952
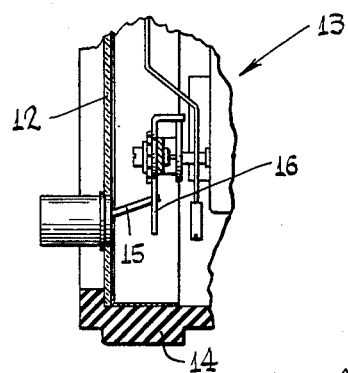
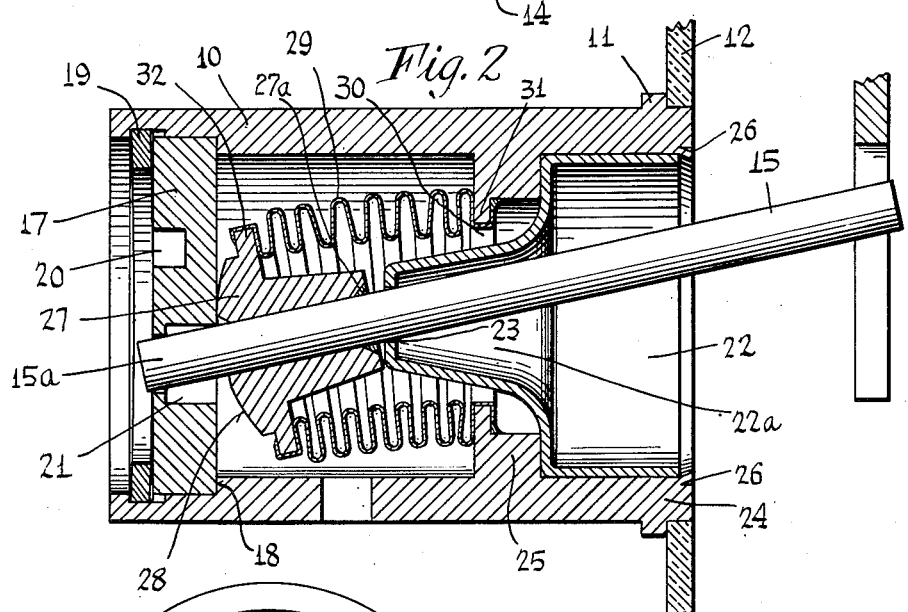
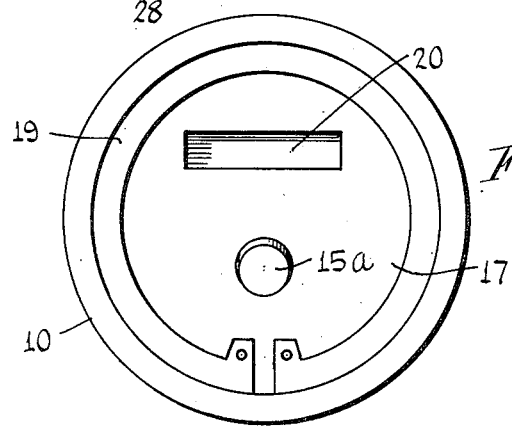
INVENTOR
Knud J. Knudsen
BY Johnson and Kline
ATTORNEYS

United States Patent Office 2,697,356
Patented Dec. 21, 1954

2,697,356

SEALED MOVEMENT-TRANSMITTING DEVICE

Knud J. Knudsen, Naugatuck, Conn., assignor to The Lewis Engineering Company, Naugatuck, Conn., a corporation of Connecticut Application July 29, 1952, Serial No. 301,489

7 Claims. (Cl. 74—18.1)

This invention relates to movement-transmitting devices, and more particularly to relatively small devices intended for this function, which are adapted to transmit movement from an external member into a sealed instrument casing without impairing the seal thereof.

The invention concerns an improvement in the device of my copending application, Serial No. 115,851, filed September 15, 1949, entitled "Rotation-Transmitting Device," now Patent No. 2,617,306 granted on November 11, 1952.

In the device of this copending application a tubular casing is provided, having within it a bellows and mounting a turnable part which carries and actuates a shaft secured and sealed to the bellows. The turnable part in addition to having a rotatable driving connection with the shaft, maintains the axis of the shaft out of parallelism with the axis of the tubular casing. The said rotatable driving connection comprises a machine screw which is threaded into the shaft and which passes through a bearing aperture in the turnable member.

The device of my copending application identified above operates satisfactorily, being small, compact and reliable in use. However, the specific bearing construction utilized necessitates the maintenance of fairly close manufacturing tolerances, introducing an undesirable factor in its mass production.

By the present invention I overcome this disadvantage of my prior device. Accordingly an object of the invention is to provide an improved, hermetically-sealed operator of the type described, wherein it is not necessary to maintain close manufacturing tolerances and still obtain reliable and accurate operation.

Another object of the invention is to provide an improved sealed operator as above set forth, wherein few, relatively simple parts are involved, permitting easy assembly and economical fabrication.

In accomplishing the above objects I provide an improved movement-transmitting structure comprising a tubular casing, a shaft extending longitudinally in the casing, and a pair of spaced bearings for the shaft, one of said bearings being eccentrically located in a member which is turnable with respect to the casing. The shaft carries means providing shoulders engageable with the spaced bearing to limit axial movement of the shaft, and a bellows is located in the casing, having one end secured and sealed to the casing and the other end secured and sealed to the shaft. In this construction I do not depend on supporting the shaft wholly on the turnable member, as is the case in the device of my copending application. Therefore the dimensions of the bearing means need not be so closely held, and the manufacturing tolerances may be much more liberal without adversely affecting the operation of the device.

Other features and advantages will hereinafter appear.

In the accompanying drawings:

Figure 1 is a fragmentary sectional view of a sealed instrument casing showing the improved sealed operator of the present invention in side elevation.

Fig. 2 is an axial sectional view of the improved sealed operator greatly enlarged.

Fig. 3 is a front elevational view of the sealed operator, also enlarged.

Referring to Fig. 2, the improved operator or movement-transmitting device of this invention comprises a tubular casing 10 arranged at one end, as by the provision of an external annular shoulder 11, to be mounted on and hermetically sealed to a transparent window 12 of an instrument movement. In Fig. 1 such as instrument movement is indicated at 13, mounted in an instrument casing 14 which carries at its front the transparent window 12.

The sealed operator has a shaft 15 which extends axially within the casing 10, the shaft projecting from one end of the casing and engaging an adjustment fork 16 of the instrument 13, as for the purpose of adjusting the zero setting of the instrument movement.

The casing 10 at its front end rotatably carries a turnable member or disk 17 which is positioned against a shoulder 18 in the casing and held in position by an expansion ring 19, which may be of the type known commercially as a Tru-arc ring.

In its front face the turnable member 17 has a slot 20 to accommodate the bit of a screw driver or the like, whereby the member may be turned for the purpose of actuating the shaft 15. The turnable member 17 also has a bearing aperture 21 which is located eccentrically or off-center, said bearing aperture being arranged to receive the front end 15a of the shaft 15. I prefer to make the bearing aperture 21 with two different diameters to enable the shaft 15 to have a limited pivotal movement in the aperture, as shown and described later in detail.

I provide a second bearing for the shaft 15, also arranged to permit a limited pivotal movement thereof. This second bearing comprises a cup 22 having a conically formed bottom 22a in the shape of a truncated cone, said bottom having a bearing aperture 23 through which the shaft 15 passes. The cup 22 is carried within the casing 10 at the rear end 24 thereof, being positioned by an internal annular shoulder 25 and being held in position by staking the edge of the casing 10, as indicated at 26.

The bearing aperture 23 is preferably concentric with respect to the casing 10, and is spaced a substantial distance from the bearing aperture 21 in the turnable member. It will be understood that when the turnable member 17 is rotated, as by insertion of a screw driver bit in the slot 20 thereof, the shaft 15 will fulcrum about the bearing 23 and will follow a path formed by two co-axial cones having their apices joined or closely adjacent each other.

In accordance with this invention, I provide a collar 27 on the shaft 15, said collar being soldered to the shaft as shown at 27a or otherwise fixedly secured thereto and being adapted to engage the bearing 23 and the inside surface of the turnable member 17 so as to limit axial movement of the shaft 15. The collar 27 may have any suitable shape, and I prefer to enlarge the front end thereof and provide the same with the convex bearing surface 28 to enable it to be more closely accommodated in the space provided for it. The convex surface 28 will engage the rear surface of the turnable member or disk 17 and will have a rolling action thereof when the disk is turned, as will be readily understood.

Within the casing 10 I provide a bellows 29 having one end 30 secured and sealed to an internal annular flange 31 of the casing and having its other end secured and sealed to an external annular flange 32 on the collar 27.

The bellows 29 thus hermetically seals the operator. When the disk 17 is turned, it will cause the shaft 15 to follow a path defined by a cone as above explained, and will result in the adjustment fork 16 of the instrument movement 13 being actuated one way or the other, depending on the direction of turning of the disk. The collar 27 will effectively prevent axial movement of the shaft 15 and will accordingly prevent damage or deformation of the bellows 29.

I have found that the bearing aperture 23 in the cup 21 may be originally made to have a true cylindrical wall, and that it will be formed and accommodate itself to the shaft during the initial period of operation of the device. Also by the provision of the enlarged or relieved bore comprising a larger portion of bearing aperture 20 in the disk 17, the remainder of said aperture may be originally made to have a true cylindrical wall. The walls of this bearing aperture will also be formed and accommodate itself to the shaft 15 during the initial operation of the device.

The improved sealed operator as above set forth consists of relatively few parts, said parts being simple in construction, economical to fabricate and to assemble. The operation of the device has been found to be consistently reliable throughout an extended period of use. Moreover the device is extremely small and compact, and thus ideally suited for use in connection with sealed casings of delicate instrument movements.

Variations and modifications may be made within the scope of the claims and portions of the improvements may be used without others.

I claim:

1. A sealed, rotation-transmitting device comprising an apertured member; a shaft extending through said member; a bearing for the shaft, connected with the member; a turnable part mounted on the member for rotation, said part having an eccentrically located bearing for said shaft, spaced from said first bearing; means providing shoulders engaging said bearings to limit end-wise movement of the shaft; and a bellows surrounding the shaft, having one end secured and sealed to the said means and having its other end secured and sealed to the member around the aperture thereof.

2. The invention as defined in claim 1 in which the means providing shoulders on the shaft comprises a collar fixed to the shaft, having a convex-shaped end for engagement with the said turnable part.

3. A sealed, rotation-transmitting device comprising a tubular casing; a shaft extending substantially longitudinally in the casing; a bearing for the shaft, connected with the casing; a turnable member mounted on the casing for rotation, said member having an eccentrically located bearing for said shaft, spaced from said first bearing; means provided shoulders engaging said bearings to limit end-wise movement of the shaft; and a bellows in the casing, having one end secured and sealed to the said means and having its other end secured and sealed to the inside of the casing.

4. The invention as defined in claim 3 in which the said bearing for the shaft comprises a cone-shaped part having its base secured to one end portion of the casing, said part having a tapered portion disposed in the casing and provided with a bearing aperture in its inner end.

5. The invention as defined in claim 4 in which the inner end of the cone-shaped part is located substantially midway between the ends of the casing, and in which the turnable member comprises a disk located adjacent the end of the casing which is remote from the base of the cone-shaped part.

6. In a sealed, rotation-transmitting device of the type having an apertured member, a bellows secured end-on to said member around the aperture thereof, a shaft secured to the other end of the bellows and having a portion which is extended through the bellows, and a turnable part adjacent said other end of the bellows, said part being rotatable about a fixed axis with respect to said apertured member and having an eccentrically located bearing through which the shaft passes, the improvement which comprises: means including co-engaging shoulders one on said shaft and another on the turnable part, limiting end-wise movement of the shaft in one direction; a second bearing for the shaft, connected with the apertured member and engaging the said extended portion of the shaft at a point spaced from the bearing of the turnable part; and means including coengaging shoulders one on said shaft and another on said second bearing, limiting end-wise movement of the shaft in the opposite direction, said bellows being connected with both said shoulders of the shaft.

7. A sealed, rotation-transmitting device comprising a tubular casing; a bellows extending longitudinally within the casing, one end of said bellows being secured and sealed to the casing; a turnable member rotatably mounted in the casing adjacent the other end of the bellows, said member having an eccentrically located bearing; a shaft having a portion extended through the bellows, said shaft engaging the bearing of the turnable member; a second bearing for the shaft, engaging the said extended portion thereof; and means providing shoulders on the shaft, engaging the bearings of the shaft to limit end-wise movement thereto, said bellows being connected to said means.

References Cited in the file of this patent

UNITED STATES PATENTS

| Number | Name | Date |
|---|---|---|
| 1,702,762 | Brubaker | Feb. 19, 1929 |
| 2,065,834 | Swennes | Dec. 29, 1936 |
| 2,454,340 | Reichel | Nov. 23, 1948 |
| 2,513,184 | Lamb | June 27, 1950 |
| 2,617,306 | Knudsen | Nov. 11, 1952 |